(12) United States Patent
Kwon et al.

(10) Patent No.: US 9,414,206 B2
(45) Date of Patent: Aug. 9, 2016

(54) MOBILE TERMINAL USING CONTACT INFORMATION FROM A SOCIAL NETWORK SERVICE AND METHOD THEREOF

(71) Applicant: LG ELECTRONICS INC., Seoul (KR)

(72) Inventors: Arim Kwon, Gyeonggi-Do (KR); Sunah Lee, Seoul (KR); Yunmi Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 14/591,613

(22) Filed: Jan. 7, 2015

(65) Prior Publication Data

US 2015/0119007 A1 Apr. 30, 2015

Related U.S. Application Data

(63) Continuation of application No. 13/705,507, filed on Dec. 5, 2012, now Pat. No. 8,954,031.

(30) Foreign Application Priority Data

Dec. 7, 2011 (KR) .......................... 10-2011-0130423

(51) Int. Cl.
*H04M 3/42* (2006.01)
*H04B 1/38* (2015.01)
(Continued)

(52) U.S. Cl.
CPC ............... *H04W 4/08* (2013.01); *G06Q 10/107* (2013.01); *H04M 1/274508* (2013.01); *H04M 1/274533* (2013.01); *H04M 1/72536* (2013.01); *H04M 1/72552* (2013.01); *H04M 1/72555* (2013.01)

(58) Field of Classification Search
CPC .................................. H04M 3/42; H04B 1/38
USPC ............................. 455/414.1, 415, 416, 566
See application file for complete search history.

(56) References Cited

U.S. PATENT DOCUMENTS 6,269,369 B1 * 7/2001 Robertson .............. G06Q 10/02
7,133,899 B2 11/2006 Rowe ............................ 709/206
(Continued)

FOREIGN PATENT DOCUMENTS

| CN | 101489199 | 7/2009 |
| CN | 101702740 | 5/2010 |
| WO | WO 2011/099796 | 8/2011 |

OTHER PUBLICATIONS

Chinese Office Action issued in Application No. 201210526244.4 dated Mar. 26, 2014.
(Continued)

*Primary Examiner* — Christopher M Brandt
(74) *Attorney, Agent, or Firm* — KED & Associates, LLP

(57) ABSTRACT

There is disclosed a mobile terminal for providing a convenient and effective contact management function by providing differentiated services for two or more connected contacts, respectively. To this end, there is provided an operation control method of a mobile terminal, and the method may include displaying a contact list containing a plurality of contacts; designating a first contact in the contact list as a first recipient according to a user's input; designating at least one second contact as a second recipient when there exists the at least one second contact connected to the first contact; and performing a first operation for the first recipient, and performing a second operation subordinate to the first operation for the second recipient.

20 Claims, 18 Drawing Sheets

(51) Int. Cl.
   *H04W 4/08*      (2009.01)
   *G06Q 10/10*     (2012.01)
   *H04M 1/2745*    (2006.01)
   *H04M 1/725*     (2006.01)

(56) References Cited

U.S. PATENT DOCUMENTS

| | | | |
|---|---|---|---|
| 7,953,805 B2 | 5/2011 | Gupta et al. | 709/206 |
| 8,150,422 B2* | 4/2012 | Eldering | H04L 29/12122 455/456.6 |
| 8,428,656 B2* | 4/2013 | Irie | H04W 8/18 455/415 |
| 2003/0153337 A1* | 8/2003 | Ito | H04M 1/57 455/517 |
| 2004/0235520 A1 | 11/2004 | Cadiz et al. | 455/557 |
| 2005/0048930 A1* | 3/2005 | Arimitsu | H04M 1/2745 455/90.2 |
| 2005/0059418 A1 | 3/2005 | Northcutt | 455/517 |
| 2005/0151642 A1 | 7/2005 | Tupler et al. | 340/539.18 |
| 2005/0261011 A1 | 11/2005 | Scott | 455/466 |
| 2007/0036137 A1 | 2/2007 | Horner et al. | 370/352 |
| 2007/0054661 A1* | 3/2007 | Park | H04M 1/576 455/418 |
| 2007/0105531 A1 | 5/2007 | Schroeder, Jr. | 455/411 |
| 2008/0003992 A1* | 1/2008 | Gautier | H04M 1/56 455/418 |
| 2008/0080687 A1 | 4/2008 | Broms | 379/142.02 |
| 2008/0081653 A1 | 4/2008 | Mock et al. | 455/518 |
| 2008/0153508 A1* | 6/2008 | Hao | H04W 4/02 455/456.2 |
| 2008/0153518 A1 | 6/2008 | Herberger et al. | 455/466 |
| 2008/0235334 A1 | 9/2008 | Gupta et al. | 709/206 |
| 2010/0081419 A1 | 4/2010 | Chiang et al. | 455/416 |
| 2010/0190468 A1 | 7/2010 | Scott et al. | 455/404.2 |
| 2010/0216442 A1 | 8/2010 | Kim | 455/415 |
| 2010/0261508 A1 | 10/2010 | Chang et al. | 455/566 |
| 2010/0262928 A1 | 10/2010 | Abbott | 715/769 |
| 2010/0273447 A1 | 10/2010 | Mann et al. | 455/405 |
| 2011/0082896 A1 | 4/2011 | Kumar et al. | 709/202 |
| 2011/0225254 A1 | 9/2011 | Atkins et al. | 709/206 |
| 2012/0064925 A1 | 3/2012 | Dhallwal et al. | 455/466 |
| 2013/0024776 A1 | 1/2013 | Ramirez | 715/739 |

OTHER PUBLICATIONS

European Search Report issued in Application No. 12 00 8110 dated Apr. 3, 2013.
SPRINT: "Palm Pre Phone User Guide", Jan. 1, 2009, pp. 1-344, Retrieved from the Internet: URL:http://www.hpwebos.com/us/support/handbooks/pre/plOOeww/PalmPre_UG_Sprint_plOOeww.pdf (XP-002669579).
U.S. Office Action issued in co-pending U.S. Appl. No. 13/705,507 dated Jun. 16, 2014.
U.S. Notice of Allowance issued in co-pending U.S. Appl. No. 13/705,507 dated Oct. 1, 2014.

* cited by examiner

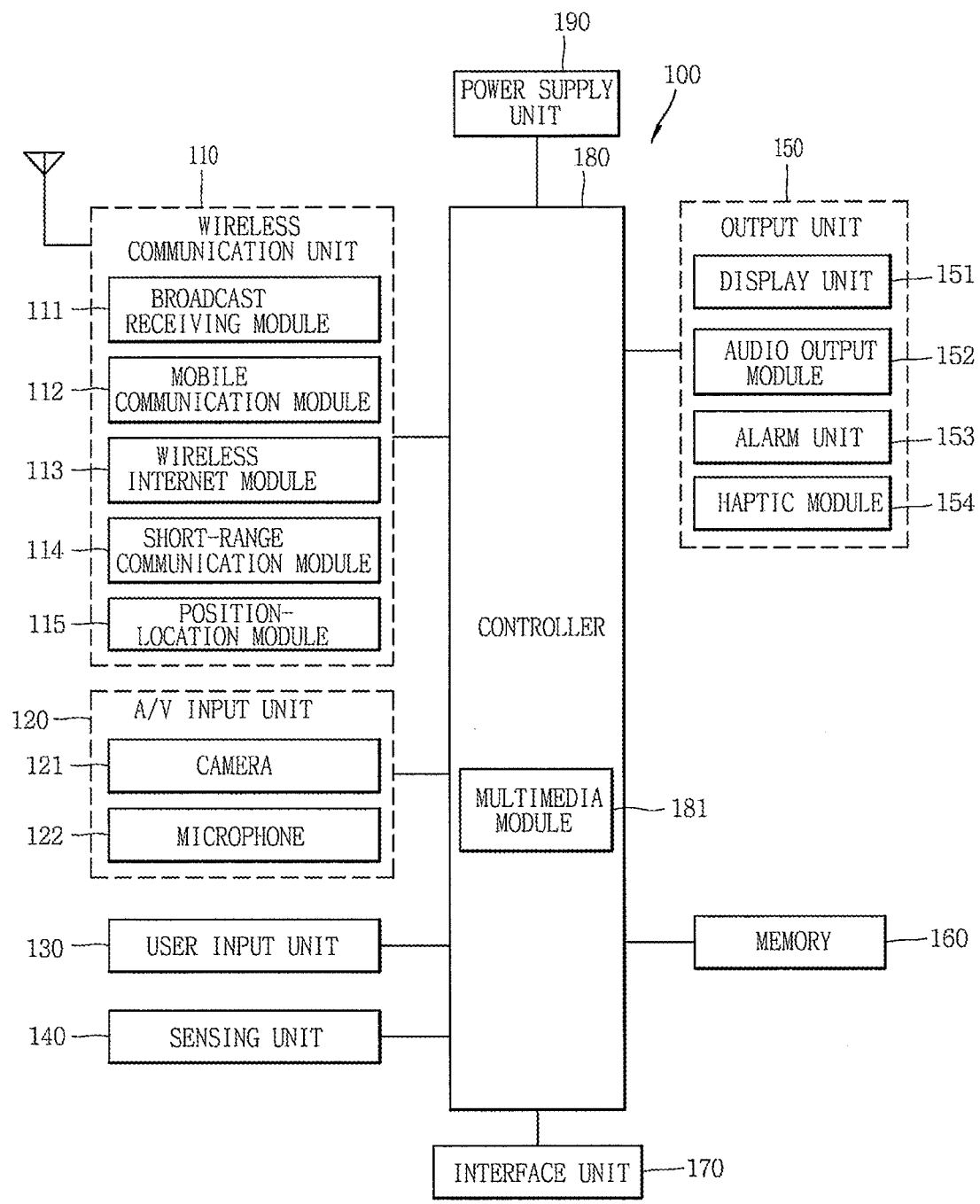

FIG. 4
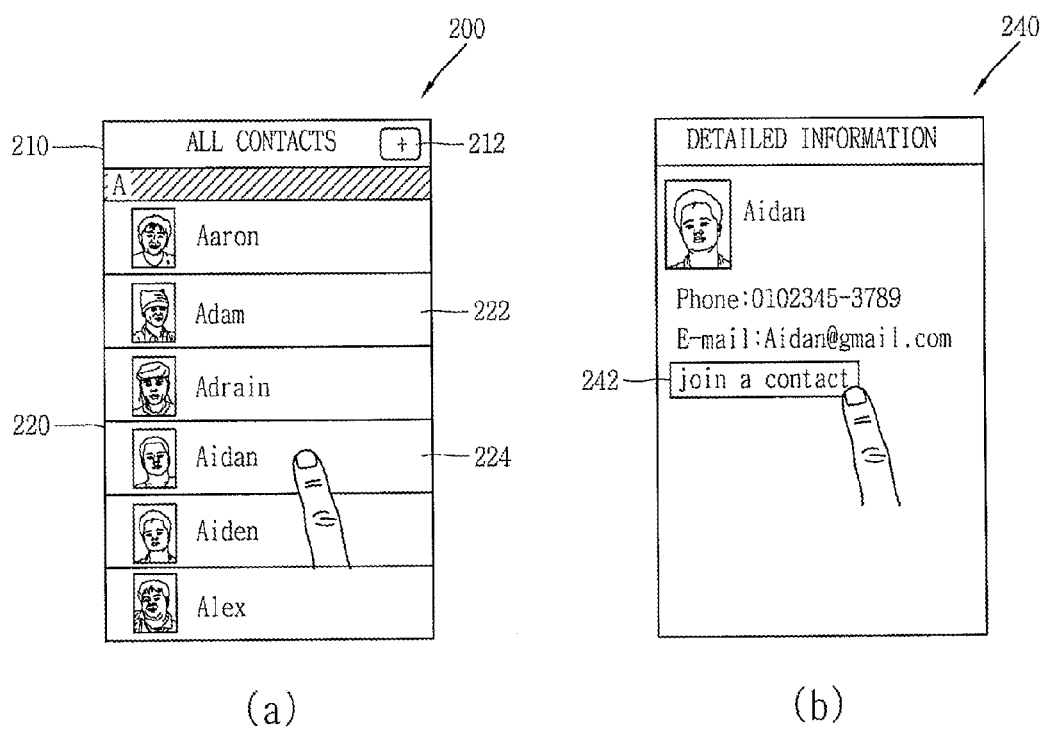
(a)  (b)
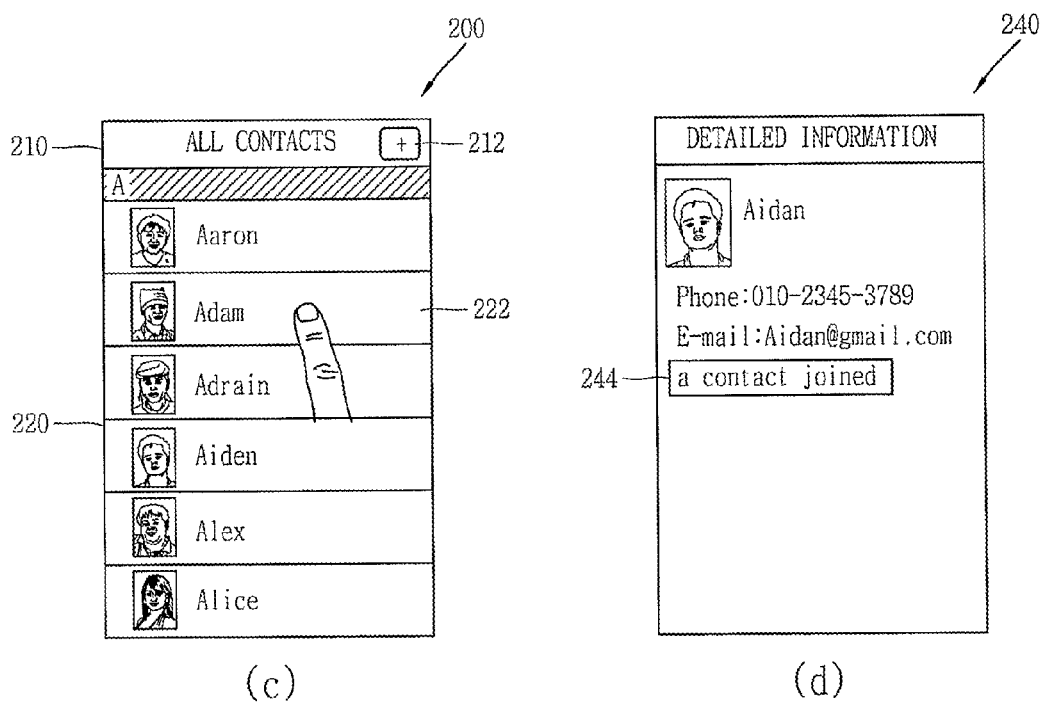
(c)  (d)

FIG. 8
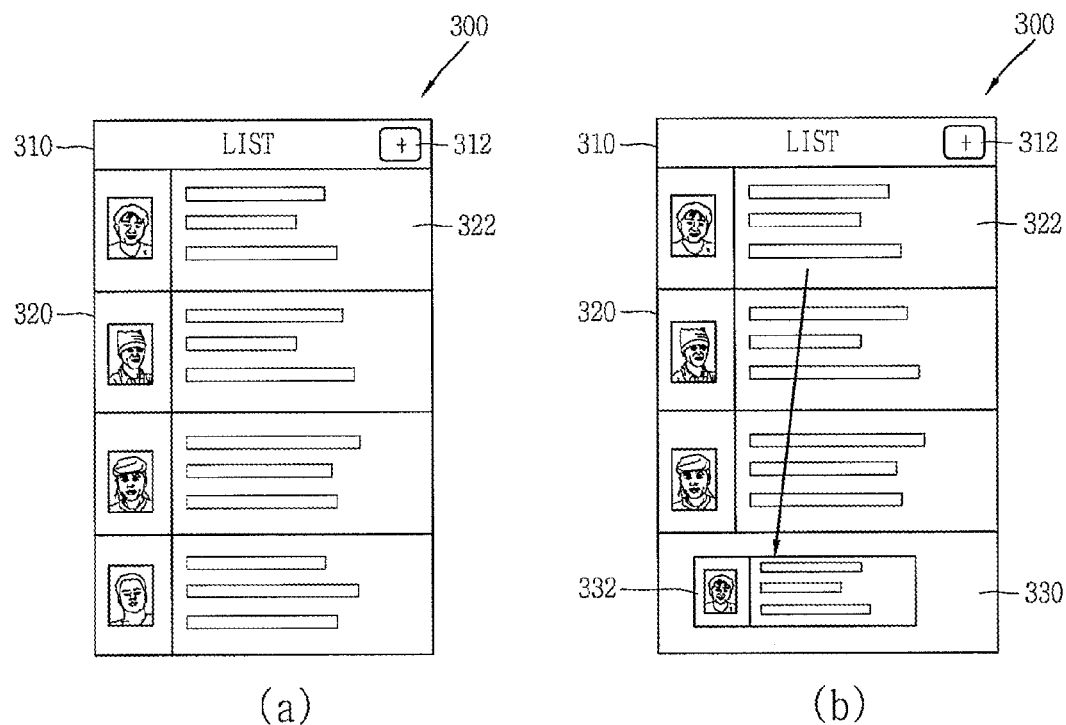
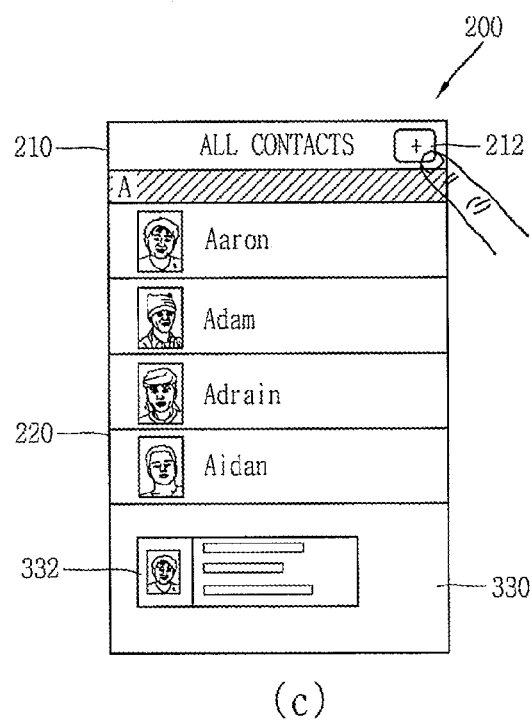

FIG. 9
(a) 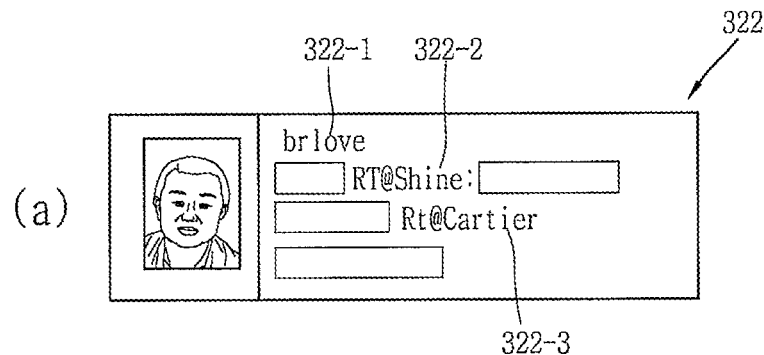
(b) 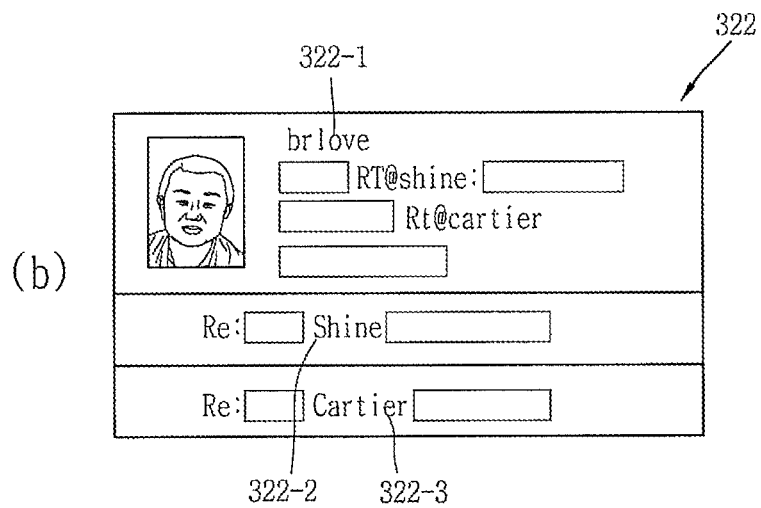
(c) 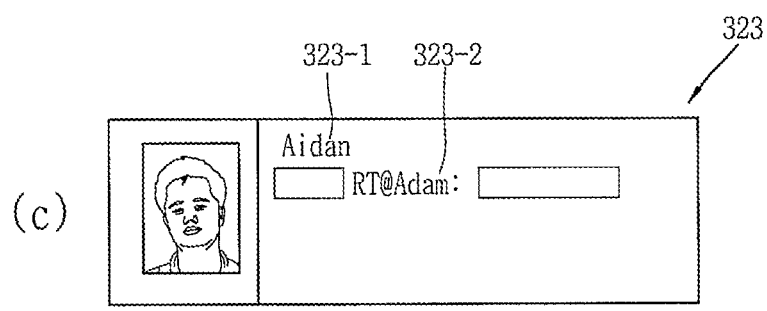

FIG. 10
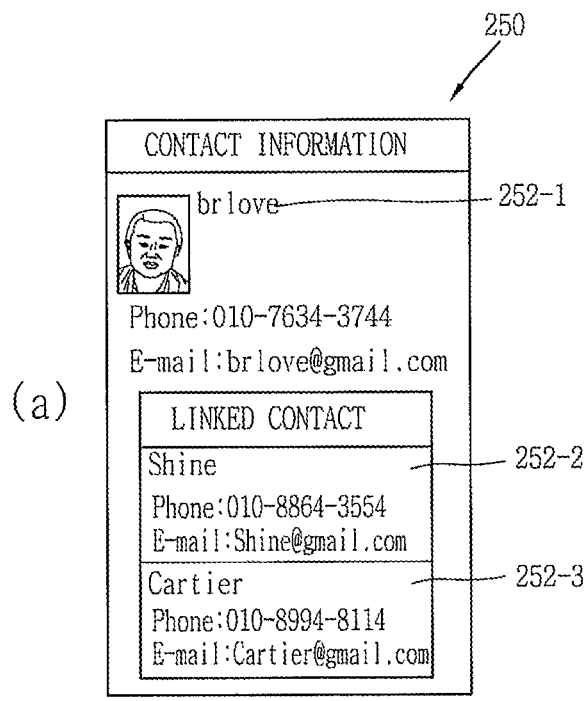
(a)
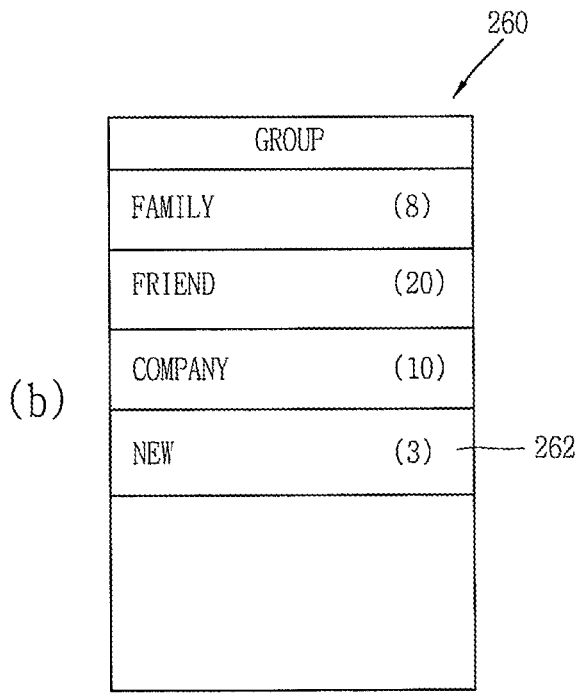
(b)

MOBILE TERMINAL USING CONTACT INFORMATION FROM A SOCIAL NETWORK SERVICE AND METHOD THEREOF

CROSS-REFERENCE TO RELATED APPLICATION

This application is a Continuation of co-pending application Ser. No. 13/705,507 filed on Dec. 5, 2012, which claims priority under 35 U.S.C. §119(a) to Korean Application No. 10-2011-0130423, filed on Dec. 7, 2011, whose entire disclosure is hereby incorporated by reference.

BACKGROUND

1. Field of the Invention

The present disclosure relates to a mobile terminal and an operation control method thereof, and more particularly, to a mobile terminal having a contact store function and operation control method thereof.

2. Background

Terminals can be classified into a mobile terminal and a stationary terminal based on its mobility. Furthermore, the mobile terminal can be further classified into a handheld terminal and a vehicle mount terminal based on whether or not it can be directly carried by a user.

As it becomes multifunctional, the terminal can be allowed to capture still images or moving images, play music or video files, play games, receive broadcast and the like, so as to be implemented as an integrated multimedia player. Moreover, the improvement of the terminal may be taken into consideration in the aspect of structure or software to support and enhance the function of the terminal.

For example, a mobile terminal may provide various functions associated with contacts, and more particularly, provide a group management function for collectively managing a plurality of contacts. In general, the group management function may provide a function for performing the same operation for each constituent member separately.

The above references are incorporated by reference herein where appropriate for appropriate teachings of additional or alternative details, features and/or technical background.

SUMMARY

In order to solve the foregoing problem, at least an object of the present disclosure is to provide a mobile terminal for providing a convenient and effective contact management function.

BRIEF DESCRIPTION OF THE DRAWINGS

The embodiments will be described in detail with reference to the following drawings in which like reference numerals refer to like elements wherein:

FIG. 1 is a block diagram illustrating a mobile terminal 100 associated with an embodiment;

FIG. 4 is a view illustrating the operation example of a mobile terminal 100 according to an embodiment disclosed herein;

FIG. 8 is a view illustrating the operation example of a mobile terminal 100 according to a first embodiment disclosed herein;

FIG. 9 is a view specifically illustrating a bulletin 322 shown in FIG. 8;

FIG. 10 is a view illustrating a result to which a contact disclosed herein is linked;

DETAILED DESCRIPTION

Figure 2A:
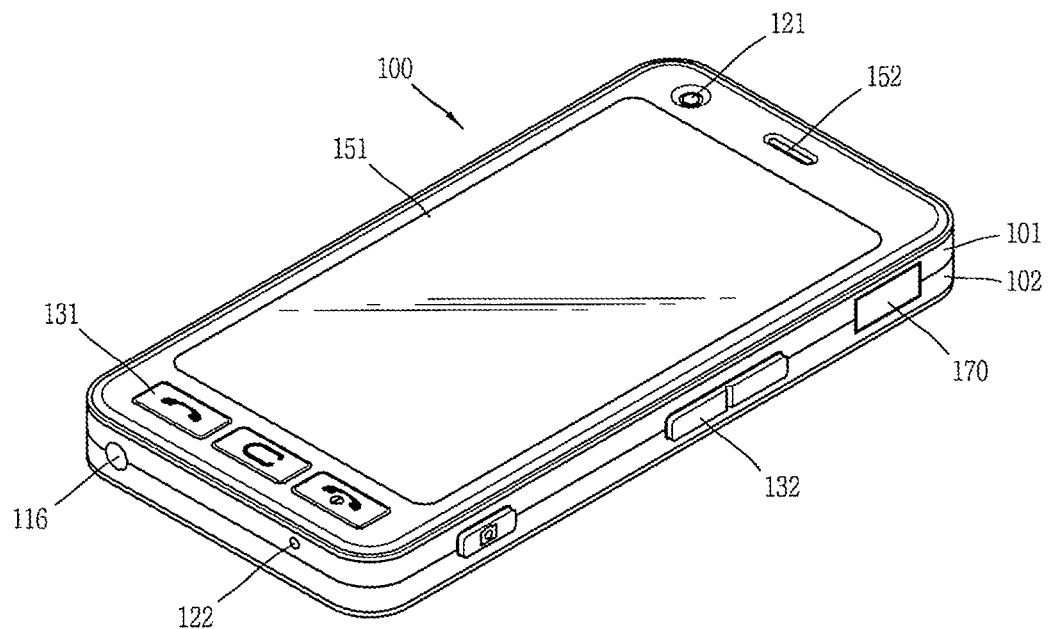
FIGS. 2A and 2B are perspective views illustrating the external appearance of a mobile terminal 100.

Hereinafter, the embodiments of the present disclosure will be described in detail with reference to the accompanying drawings to such an extent that the present disclosure can be easily embodied by a person having ordinary skill in the art to which the present disclosure pertains. However, the present disclosure may be implemented in various different forms, and therefore, the present disclosure is not limited to the illustrated embodiments. In order to clearly describe the present disclosure, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with the present disclosure. Referring to FIG. 1, the mobile terminal 100 may include a wireless communication unit 110, an audio/video (NV) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module (position-location module) 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of explanation, the behavior of a sensing object being placed in proximity with the touch screen without being brought into contact with the touch screen may be referred to as a "proximity touch", whereas the behavior of a sensing object being brought into contact with the touch screen may be referred to as a "contact touch".

The proximity sensor 141 may sense the presence or absence of a proximity touch and a proximity touch pattern (for example, a proximity touch distance, a proximity touch direction, a proximity touch velocity, a proximity touch time, a proximity touch position, a proximity touch moving state, etc.) Information corresponding to the presence or absence of a proximity touch and the proximity touch pattern may be displayed on the touch screen.

The output unit 150 may generate an output associated with visual, auditory, tactile senses. The output unit 150 may include a display unit 151, an audio output module 153, an alarm unit 154, a haptic module 155, and the like.

The display unit 151 may display (output) information processed in the mobile terminal 100. For example, when the mobile terminal 100 is operated in a phone call mode, the display unit 151 may display a user interface (UI) or graphic user interface (GUI) associated with a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a three-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output an audio signal associated with a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 152, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 155 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 155 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2B:
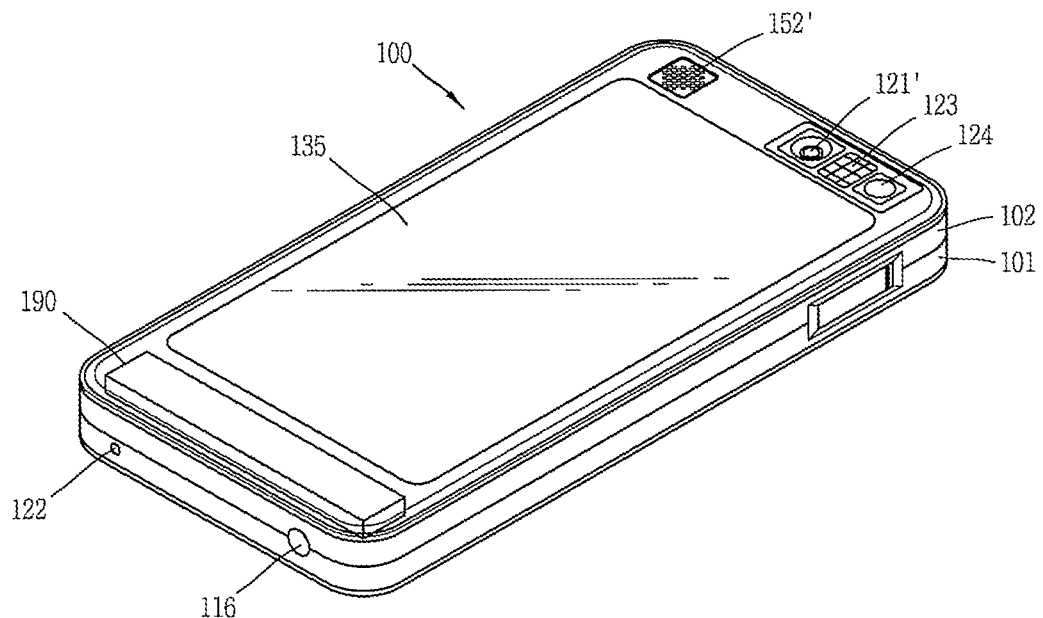

FIGS. 2A and 2B are perspective views illustrating the external appearance of a mobile terminal 100 associated with the present disclosure. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present disclosure is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The manipulation units 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, that the front camera 121 may be configured to have a relatively small number of pixels, and the rear camera 121' may be configured to have a relatively large number of pixels. Accordingly, in case where the front camera 121 is used for video communication, it may be possible to reduce the size of transmission data when the user captures his or her own face and sends it to the other party in real time.

On the other hand, the rear camera 121' may be used for the purpose of storing high quality images.

On the other hand, the cameras 121, 121' may be provided in the terminal body in a rotatable and popupable manner.

Furthermore, a flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

Furthermore, a rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

Hereinafter, a mobile terminal having the function of providing different services with a command for two or more contacts connected to each other and a user interface for connecting two or more different contacts will be described.

The display unit 151 according to a first embodiment disclosed herein displays a contact list containing a plurality of contacts. The user input unit 130 receives an input for designating a first recipient. The controller 180 designates a first contact in the contact list as a first recipient according to a user's input, and designates at least one second contact as a second recipient when there exists the at least one second contact connected to the first contact. The wireless communication unit 110 performs a first operation for the first recipient, and performs a second operation subordinate to the first operation for the second recipient.

The display unit 151 according to a second embodiment disclosed herein displays a list containing a plurality of items on a display unit. The user input unit 130 receives an input for configuring a storage area on the display unit, and the controller 180 configures the storage area on the display unit according to a user's input. The user input unit 130 also receives an input for selecting a first item from the list, and the controller 180 selects the first item from the list according to the user's input, and stores the selected first item in the storage area. Furthermore, the controller 180 connects a first contact associated with the first item to a second contact associated with a second item selected from the list, and stores them in the memory 160.

The user input unit 130 detects an input for dragging and dropping one item from the list to the storage area, and the controller 180 selects the one item as a first item. Again, the user input unit 130 detects an input for dragging and dropping the first item from the storage area to the list, and the controller 180 selects an item corresponding to the position at which the first item has been dropped as the second item.

The display unit 151 according to a third embodiment disclosed herein displays a list containing a plurality of items on a display unit. The user input unit 130 receives an input for configuring a storage area on the display unit, and the controller 180 configures the storage area on the display unit according to a user's input. The user input unit 130 also receives an input for selecting at least one item from the list, and the controller 180 selects the at least one item from the list according to the user's input, and stores the selected at least one item in the storage area. Furthermore, the controller 180 connects a plurality of contacts associated with the selected at least one item, and stores them in the memory 160.

The user input unit 130 receives an input for dragging and dropping one item from the list to the storage area, and the controller 180 selects at least one item based on the input.

Furthermore, the user input unit 130 receives an input for selecting any one of the at least one items in the storage area, and the controller 180 connects a contact associated with the selected any one item to a contact associated with the other remaining item.

Furthermore, the controller 180 connects the plurality of contacts stored in a phone book when the plurality of contacts are stored in the phone book.

Referring to FIGS. 3 through 11, a mobile terminal 100 having a user interface for connecting two or more different contacts according to a first and a second embodiment disclosed herein will be described. Furthermore, referring to FIGS. 12 through 17, a mobile terminal having a function of providing different services with a command for two or more contacts connected to each other according to a third embodiment disclosed herein will be described.

Figure 3A:
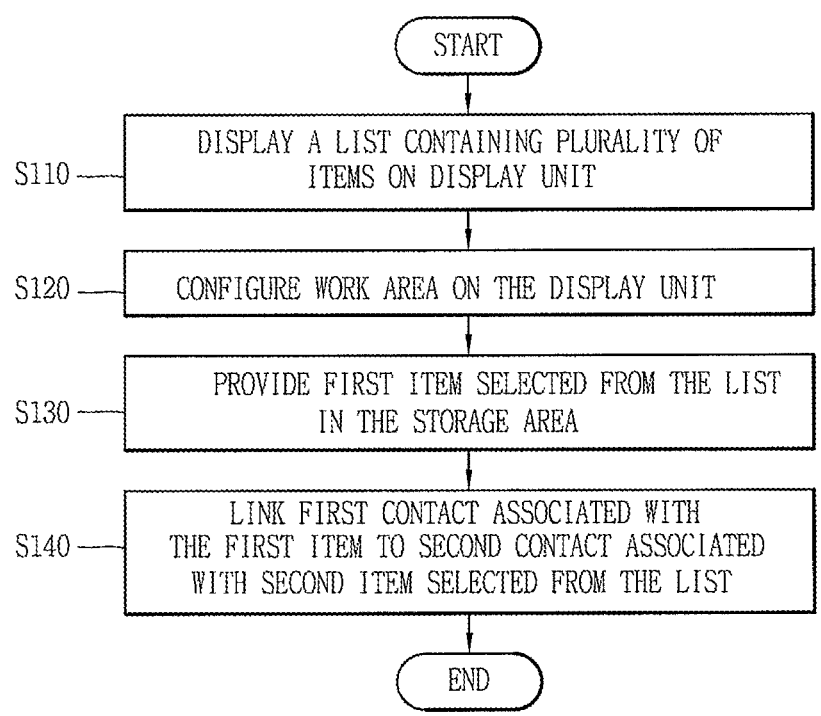
FIGS. 3A and 3B are views for explaining the method of providing a user interface in a mobile terminal according to a first and a second embodiment disclosed herein.
Figure 3B:
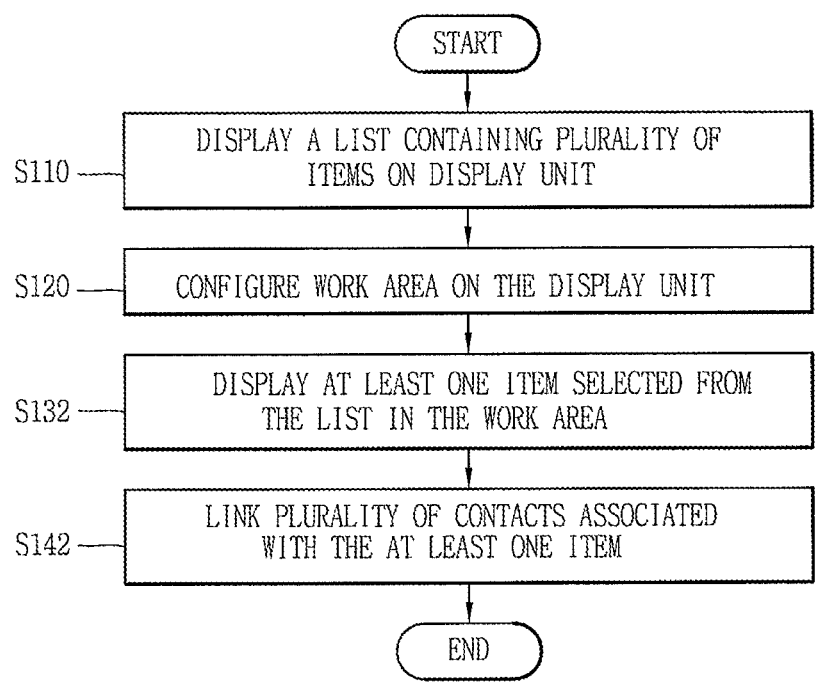

FIGS. 3A and 3B are views for explaining the method of providing a user interface in a mobile terminal according to a first embodiment disclosed herein.

Referring to FIG. 3A, the mobile terminal 100 performs a process of displaying a list containing a plurality of items on a display unit (S110). Then the mobile terminal 100 performs a process of configuring a work area on the display unit (S120). The mobile terminal 100 performs a process of displaying a first item selected from the list when the first item is dragged or dropped into the work area (S130). The mobile terminal 100 performs a process of linking a first contact associated with the first item to a second contact associated with a second item selected from the list (S140).

Referring to FIG. 3B, the mobile terminal 100 performs a process of linking at least one item selected from the list in the work area (S132) instead of the step S130. Then, the mobile terminal 100 performs a process of linking a plurality of contacts associated with the at least one item (S142).

FIG. 4 is a view illustrating the operation example of a mobile terminal 100 according to an embodiment disclosed herein. If the user selects an item configured to implement a contact list display function, then the mobile terminal 100 displays a contact list on the contact list display screen 200. The contact list may be a list of contacts stored in the mobile terminal 100 or the server.

Referring to FIG. 4(a), the contact list display screen 200 may include a title area 210 for indicating information displayed on the display unit and a list area 220 for displaying a plurality of contacts items in a list form. For example, a contact add menu icon 212 for adding a new contact may be displayed on the title area 210. In this state, a user selects a contact 224 corresponding to "Aidan" (hereinafter Aidan contact 224) to link or associate the contact 222 corresponding to "Adam" (hereinafter Adam contact 222) to the Aidan contact 224.

Referring to FIG. 4(b), if the Aidan contact 224 is selected in the list area 220, then the mobile terminal 100 may display a detailed information display screen 240 providing the detailed information of the Aidan contact 224 on the display unit. The detailed information display screen 240 may display an image, a name, and a contact indicating a person corresponding to the selected contact. Furthermore, the detailed information display screen 240 may further display a contact linking/association menu icon 242. The user selects the contact icon 242 to select a contact for linking/associating another contact to the Aidan contact 224.

Referring to FIG. 4(c), if the icon 242 is selected, then the mobile terminal 100 may display a contact selection screen 200' to allow selection of another contact to be linked to the Aidan contact 224. The user may select the Adam contact 222 to link/associate the Adam contact 222 to the Aidan contact 224 on the contact selection screen 200'. Accordingly, the mobile terminal 100 links the contact 222 to the contact 224 and such association information may be stored in the memory.

In other words, referring to FIG. 4(d), if the Aidan contact 224 is selected in the list area 220, then the mobile terminal 100 may display the detailed information display screen 240 of the Aidan contact 224 on the display unit. The detailed information display screen 240 may display an image, a name, and detailed contact information. When there exists a contact associated/linked to the Aidan contact 224, the mobile terminal 100 may display an indicator or an icon 244 indicating that there exists a contact associated or linked thereto. If the indicator 244 is selected, then the detailed information of the Adam contact 222 will be displayed.

Alternatively, the detailed information of the Adam contact 222 may be immediately displayed. As shown in FIG. 7(b), if the Aidan contact 224 is selected in the list area 220, then an information display screen 250 displays the detailed information 252 of the Aidan contact 224 linked/associated with detailed information 254 of contact 224. The connected information display screen 250 may display simultaneously the detailed information 252 of the selected first contact 224 and the detailed information 254 of the second contact 222 associated/linked to the contact 224.

Figure 5:
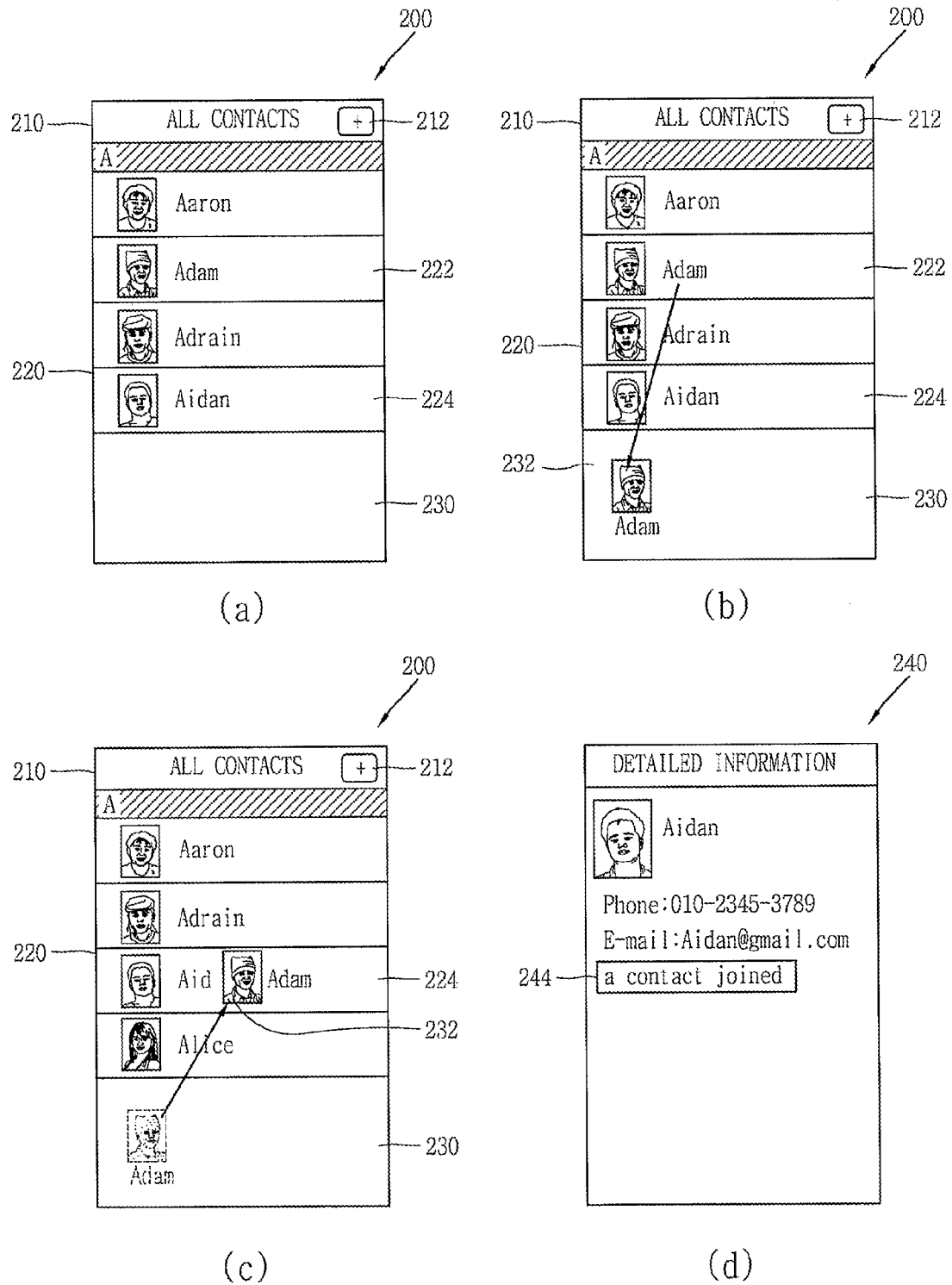
FIG. 5 is a view illustrating the operation example of a mobile terminal 100 according to a first embodiment disclosed herein.

FIG. 5 is a view illustrating the operation example of a mobile terminal 100 according to a another embodiment disclosed herein. If the user selects an item or an icon configured to execute a contact list display function, the mobile terminal 100 displays a contact list on the contact list display screen 200, as shown in FIG. 4(a). As described above, the contact list display screen 200 may include a title area 210 for indicating information displayed on the display unit and a contact list area 220 for displaying a plurality of contact items. For example, when the user performs a long touch on one contact 222 among the plurality of contacts displayed on the list area 220 or selects a predetermined menu (not shown in the drawing), a work or mini-desktop or linking area 230 for allowing manipulation of the contacts on the display unit, as shown in FIG. 5(a). The long touch may be based on the amount of time an icon or item is selected and/or based on number of fingers used to select an icon or an item.

The mobile terminal 100 may display the work area 230 on the display unit. The work area 230 may be displayed at a partial region of the display unit, and may be displayed, for example, at a lower end of the contact list display screen 200. Furthermore, the work area 230 may be displayed to overlap with a partial region of the list area 220, or may be displayed in a semi-transparent layer form to allow the user to view the overlapped contact.

Once the work area 230 is configured, the work area 230 may be continuously displayed on the display unit even though information displayed on the display unit is changed. For example, the work area 230 may be continuously displayed on the display unit even when the plurality of contacts displayed on the list area 220 are changed as a list is scrolled on the list area 220. In this case, the work area 230 may be used for linking/associating a contact which is displayed on the screen to a contact which is not displayed on the screen.

In another embodiment, the work area 230 may be continuously displayed on the display unit even though the contact list display screen 200 is switched to another screen. In this case, the work area 230 may be used for combining a contact displayed on the screen with an item displayed on another screen, or combining the plurality of contacts using a menu displayed on another screen.

Though will be described later in detail, the setting of the work area 230 may be released when a contact stored in the work area 230 is combined with another contact or an input for releasing the work area 230 is received. The work area 230 may be continuously displayed on the display unit even though information displayed on the display unit is changed unless the setting of the work area 230 is released.

Referring to FIG. 5(b), in a state that a work area is provided on the display unit, the user may touch the Adam contact 222 to drag and/or drop the touched contact 222 to the work area 230. The mobile terminal 100 may store the information of the Adam contact 222 in a buffer or store in a memory. Furthermore, the mobile terminal 100 may display an icon 232 indicating the Adam contact 222 has been placed in the working area 230. At this time, the contact 222 dropped into the working area 230 may be omitted for display from the list area 220 as shown in FIG. 5(c).

Referring to FIG. 5(c), the user may touch an icon 232 displayed on the work area 230 to drag and drop the touched icon 232 to the Aidan contact 224. Accordingly, the mobile terminal 100 may link/associate the Adam contact 222 to the Aidan contact 224 and store both of them. The Adam contact 222 may be omitted from future display in the contact list on the list area 220.

Referring to FIG. 5(d), if the Aidan contact 224 is omitted during display of the contact list on the list area 220, the mobile terminal 100 may display the detailed information display screen 240 of the relevant contact 224 on the display unit. The detailed information display screen 240 may display an image, a name, and a contact indicating the person of the contact as described above. At the same time, when there exists a contact linked to the Aidan contact 224, an indicator 244 indicating that there is a contact to be connected thereto may be displayed. If the indicator 244 is selected, then the detailed information of the Adam contact 222 linked to the Aidan contact 224 will be displayed.

Figure 7:
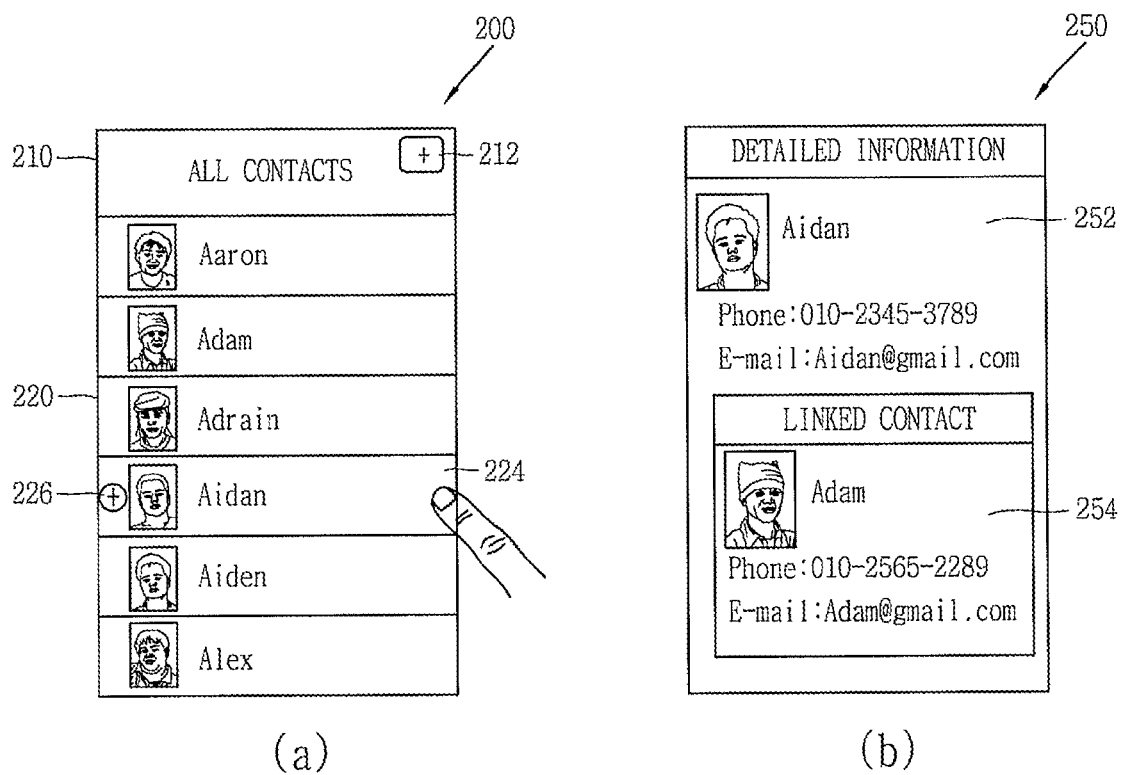
FIG. 7 is a view illustrating the operation example of a mobile terminal 100 according to a first and a second embodiment disclosed herein.

Alternatively, the detailed information of the Adam contact 222 linked to the Aidan contact 224 may be immediately displayed. In other words, if the Aidan contact 224 is selected in the list area 220, a contact information display screen 250 for displaying the detailed information of the contact 222 connected to the selected contact 224 can be displayed as illustrated in FIG. 7(*b*). The contact information display screen 250 may display the detailed information 252 of the selected contact 224 and the detailed information 254 of the contact 222 linked to the contact 224.

Figure 6:
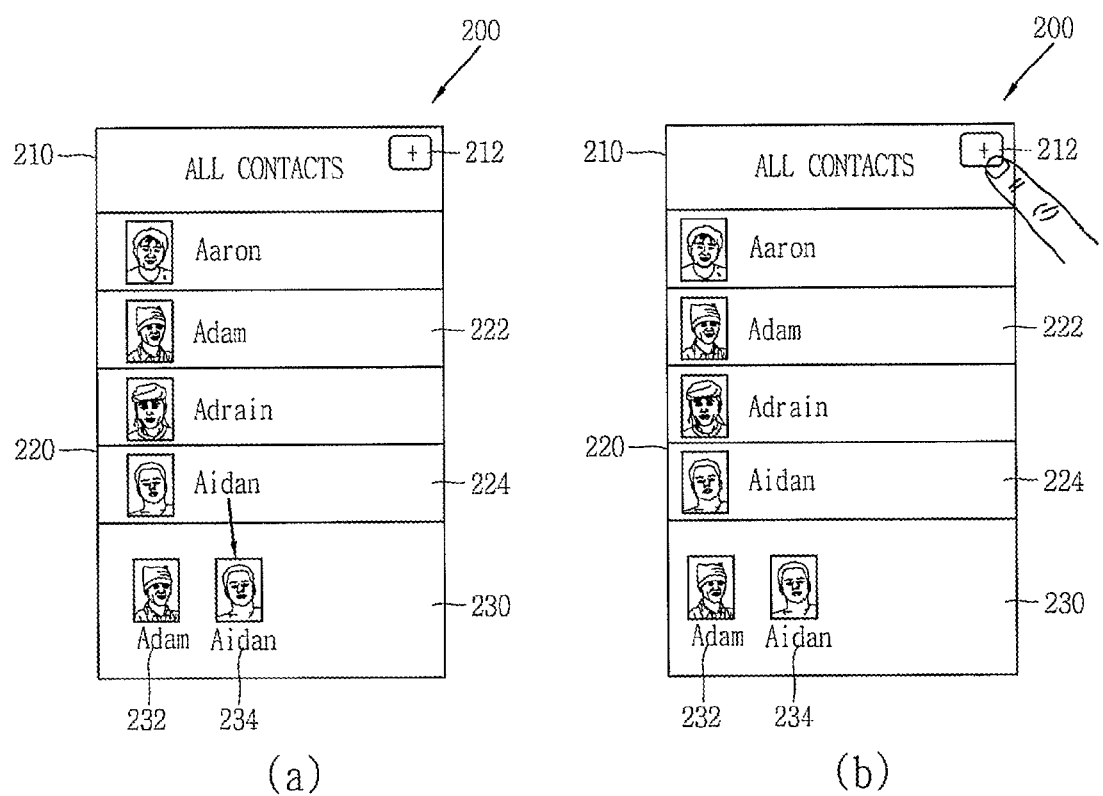
FIG. 6 is a view illustrating the operation example of a mobile terminal 100 according to a second embodiment disclosed herein.

FIG. 6 is a view illustrating the operation example of a mobile terminal 100 according to a second embodiment disclosed herein. Referring to FIG. 5(*b*) again, the user may drag and drop the Adam contact 222 to the work area 230, and accordingly, the mobile terminal 100 may store the Adam contact 222 in a buffer. An icon 232 corresponding to the Adam contact 222 is displayed on the work area 230.

In this state, referring to FIG. 6(*a*), the user may drag and drop the Aidan contact 224 to the work area 230, and accordingly, the mobile terminal 100 may store the Aidan contact 224 in a buffer. An icon 234 corresponding to the Aidan contact 222 on the work area 230.

Referring to FIG. 6(*b*), if the user selects a contact generation icon menu 212 for generating a new contact in a state that the icon 232 and the icon 234 are displayed on the work area 230, then the mobile terminal 100 may link the Adam contact 222 to the Aidan contact 224 and store both of them. Such that when Aidan contact is selected from a contact list, detailed information 240 of FIG. 5(*d*) or FIG. 7(*b*) is displayed. Likewise, such linked information may be shown when the Adam contact is selected from the contact list. Alternatively, automatic linking may occur when the Aidan contact is dragged in the work area. Alternatively, when a contact generation icon 212 is selected, a new contact entry screen may be displayed with the Adam contact 222 and the Aidan contact linked to the new contact to be entered.

FIG. 7 is a view illustrating the operation example of a mobile terminal 100 according to first and second embodiments. Referring to FIG. 7(*a*), the contact list display screen 200 may include the title area 210 and the list area 220, and an image and a name indicating each contact may be displayed on the list area 220. The mobile terminal 100 may further display an indicator 226 to distinguish the contact 224 which is linked/associated to another contact from other contact which does not include such linking.

The mobile terminal 100 may further display a contact connected to another contact 224 according to an implementation example as illustrated in FIG. 7(*a*), or may not display it. For instance, if the Adam contact is linked to the Aidan contact, the Adam contact may not be displayed on the list area 220. The user may select the Aidan contact to check/obtain the detailed information of the Adam contact.

If an indicator 242 indicating that there exists a contact linked thereto in the detailed information display screen 240 described with reference to FIG. 5(*d*) is selected, then the detailed information of the contact connected thereto will be displayed as shown in FIG. 7(*b*). Alternatively, the contact information screen 250 may be automatically displayed when Aidan contact 226 is selected. The contact information screen 250 may display the detailed information 252 of the selected contact 224 and the detailed information 254 of the contact linked to the selected contact 224.

FIG. 8 is a view illustrating the operation example of a mobile terminal 100 according to a first embodiment disclosed herein. The mobile terminal 100 may provide a function of displaying a bulletin posted through a network service such as Social Network Service (SNS), such as Twitter or Facebook, as a list form. If the user selects an icon configured to implement a bulletin list display function, then the mobile terminal 100 displays a bulletin list on a bulletin list display screen 300. The bulletin list may be a list of bulletins stored in the mobile terminal 100 or a server.

The bulletin list display screen 300 may include a title area 310 for indicating information displayed on the display unit and a list area 320 for displaying a plurality of bulletins (bulletin list). For example, a bulletin add icon 312 to add a new bulletin may be provided on the title area 310. Images indicating the publisher of each bulletin and brief information of the bulletin may be displayed on the list area 320.

Referring to FIG. 8(*b*), for example, when the user performs a long touch on one bulletin 322 among the bulletins displayed on the list area 320 or selects a predetermined menu though not shown in the drawing, a work, mini-desktop or linking area 330 capable of receiving bulletins may be configured or automatically provided on the display unit. The work area 330 may be displayed at a partial region of the display unit, and may be displayed, for example, at a lower end of the bulletin list display screen 300. Furthermore, the work area 330 may be displayed to overlap with the list area 320, or may be displayed in a semi-transparent layer form to allow the user to view the overlapped bulletin.

The user may drag and drop the long touched bulletin 322 to the storage area 330, and accordingly, the mobile terminal 100 may display an icon 332 indicating the dragged and dropped bulletin 322 on the storage area 330. The mobile terminal 100 may extract a plurality of contacts from the bulletin 322 and temporarily store them in a buffer or memory device.

Referring to FIG. 8(*c*), if the user selects the contact add icon 312 to add a new contact in a state that the icon 332 is displayed on the storage area 330, then the mobile terminal 100 may extract a plurality of contacts from the relevant bulletin 322, and link the plurality of contacts extracted from the bulletin 322 to one another. For example, another contact may be subordinately linked to one contact extracted from the bulletin 322 to store both of them.

FIG. 9 is a detailed view illustrating a bulletin 322 shown in FIG. 8. The bulletin 322 can be transferred, replied or "tweeted" by another user other than the user 322-1 who prepares the original text. In other words, the bulletin 322 can be sent to specific users designated by the user who prepares the original text, and the users 322-2, 322-3 who can view the bulletin 322 can reply or tweet the bulletin 322 to still another user. The contact of the user 322-1 who prepares the original text and the users 322-2, 322-3 who transfer the bulletin 322 may be contained in the bulletin 322. Furthermore, the user 322-1 who prepares the original text and the users 322-2, 322-3 who transfer the bulletin 322 may be displayed in a distinguished manner within the bulletin 322.

Referring to FIG. 9(*b*), if the original text of the bulletin 322 has been prepared, then the user who prepares the original text or another user may prepare an add comment in response to the original text. The contact of the user 322-1 who prepares the original text and the users 322-2, 322-3 who transfer the bulletin 322 may be contained in the bulletin 322. Furthermore, the original text and add comment may be displayed in a distinguished manner within the bulletin 322.

In this manner, the contacts of a plurality of users may be contained within one bulletin, and in this case, a plurality of contacts may be subordinately connected or linked to one contact. The foregoing user interface allow one main contact to be connected to one or more auxiliary contacts subordinately connected to the one main contact.

On the other hand, when a plurality of contacts contained in the bulletin are contacts that have been stored in advance in the contact list, the mobile terminal 100 may link or associate the relevant plurality of contacts in the contact list to store them. In other words, referring to FIG. 9(*c*), since "Aidan" 323-1 and "Adam" 323-2 which are contacts contained in the bulletin 322 have been stored in advance in the contact list, the mobile terminal 100 can associate or link the Adam contact to the Aidan contact in the contact list to store them. However, as illustrated in FIG. 9(a), since "brlove" 322-1, "Shine" 322-2 and "Cartier" 322-3 which are contacts contained in the bulletin 322 have not been stored in the contact list (or phonebook), the mobile terminal 100 may generate contacts corresponding to "brlove", "Shine" and "Cartier" in the contact list, and associate or link the generated contacts to store them.

FIG. 10 is a view illustrating a result to which a contact disclosed herein is connected, linked or associated. If the user selects the add icon or menu 312 to add a new contact in a state of FIG. 8(a) and/or the icon 332 indicating the bulletin 322 are displayed on the work area 330 of FIG. 9(b), then the mobile terminal 100 may link one or more auxiliary contacts 322-2, 322-3 to one main contact 322-1 from the relevant bulletin 322.

Referring to FIG. 10(a), when one or more auxiliary contacts 252-2, 252-3 are subordinately connected or linked to one main contact 252-1, the contact or linked information display screen 250 for displaying the detailed information of the linked contact may display the detailed information of the main contact 252-1 of the bulletin 322 and the detailed information of the auxiliary contacts 252-2, 252-3 linked to the main contact 322-1.

Referring to FIG. 10(b), when one or more auxiliary contacts 252-2, 252-3 are equally connected to one main contact 252-1, the contact group display screen 260 for displaying a contact group may generate and display a group 262 containing the main contact 252-1 of the bulletin 322 and the auxiliary contacts 252-2, 252-3 connected to the main contact 252-1.

Figure 11:
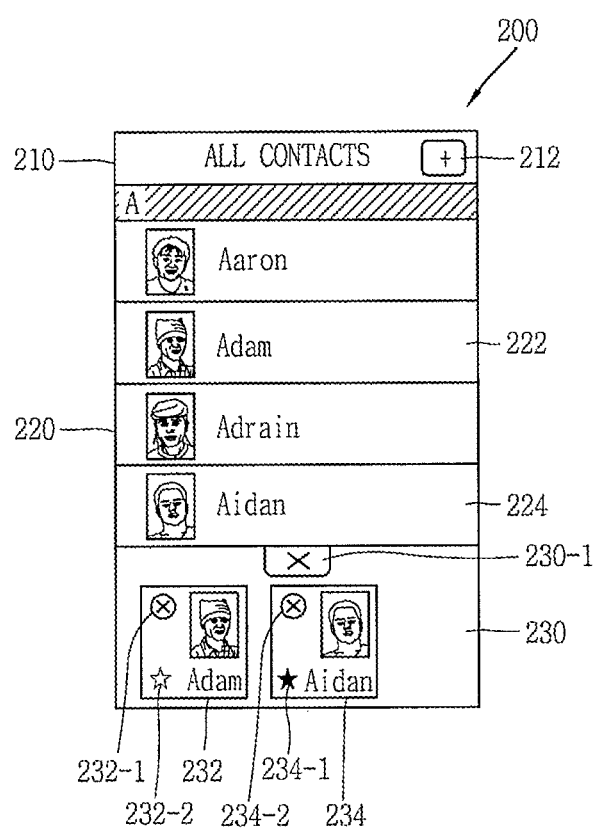
FIG. 11 is a view for specifically explaining an interface of the storage area 230 according to embodiments disclosed herein.

FIG. 11 is a view for specifically explaining an interface of the working area 230 according to embodiments disclosed herein. The work area 230 capable of displaying dragged and/or dropped contacts displayed on the list area 220 by a user's input may be configured on the display unit, and the work area 230 may be displayed at a partial region of the display unit.

The setting of the work area 230 may be released on the display unit by a user's input. For example, if a close menu or icon 230-1 of the work area 230 is selected, then items that have been overlapped with the storage area 230 will be displayed again while the work area 230 is closed.

The work area 230 may display icons 232, 234 indicating items 222, 224 selected from the item list 220. If a delete menu 232-1, 234-1 is selected, then the icons 232, 234 may be deleted from the work area 230. When two or more icons are displayed on the work area 230 in an embodiment in which one contact can be subordinately connected or linked to one or more contacts, an icon or indication 232-2, 234-2 capable of designating a contact corresponding to any one icon as main contact will be displayed. The corresponding contact can be designated as a main or auxiliary contact as the icon 232-2, 234-2 is toggled.

In the above embodiments, a work area has been shown as a way of linking two or more contacts or bulletins. As can be appreciated, linking may be also performed by simultaneously selecting two or more contacts. Alternatively, an additional linking icon may be provided on the display screen 200 or 300, or after selection of the linking icon, a user may subsequently select a plurality of items to link the selected items together.

Figure 12:
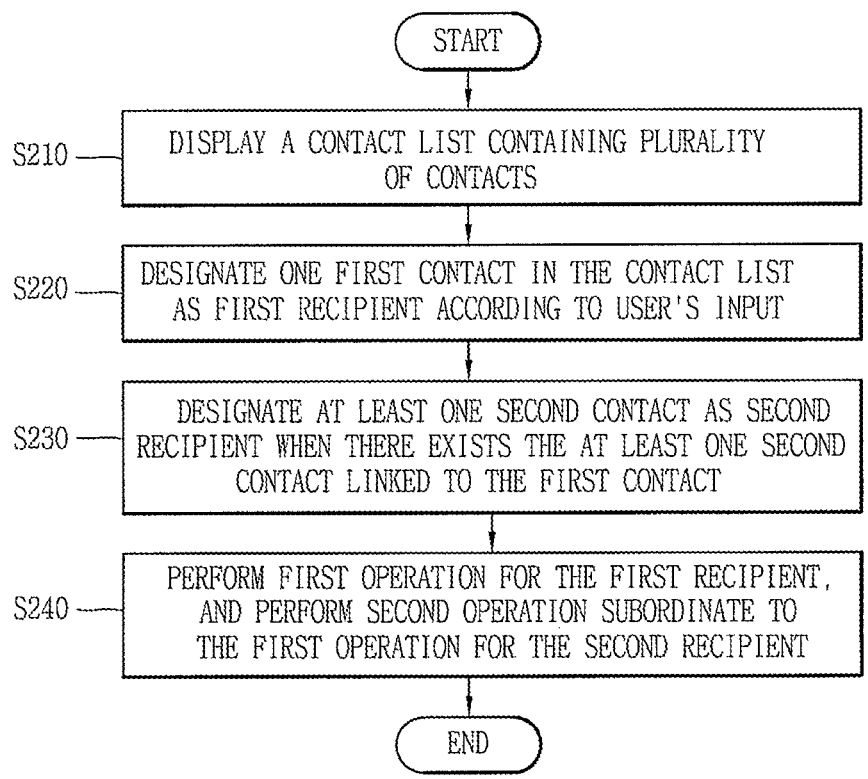
FIG. 12 is a view for explaining a method of performing the operation of a mobile terminal according to a third embodiment disclosed herein.

FIG. 12 is a view for explaining a method of performing the operation of a mobile terminal according to a third embodiment disclosed herein. The mobile terminal 100 may perform a process of displaying a contact list containing a plurality of contacts (S210). The mobile terminal 100 performs a process of designating one first contact in the contact list as a first recipient according to a user's input (S220). When there exists at least one second contact linked to the first contact, the mobile terminal 100 performs a process of designating the at least one second contact as a second recipient (S230). The mobile terminal 100 performs a process of performing a first operation for the first recipient, and performing a second subordinate operation to the first operation for the second recipient (S240). The first operation and the subordinate operation may be the same or different.

Figure 13:
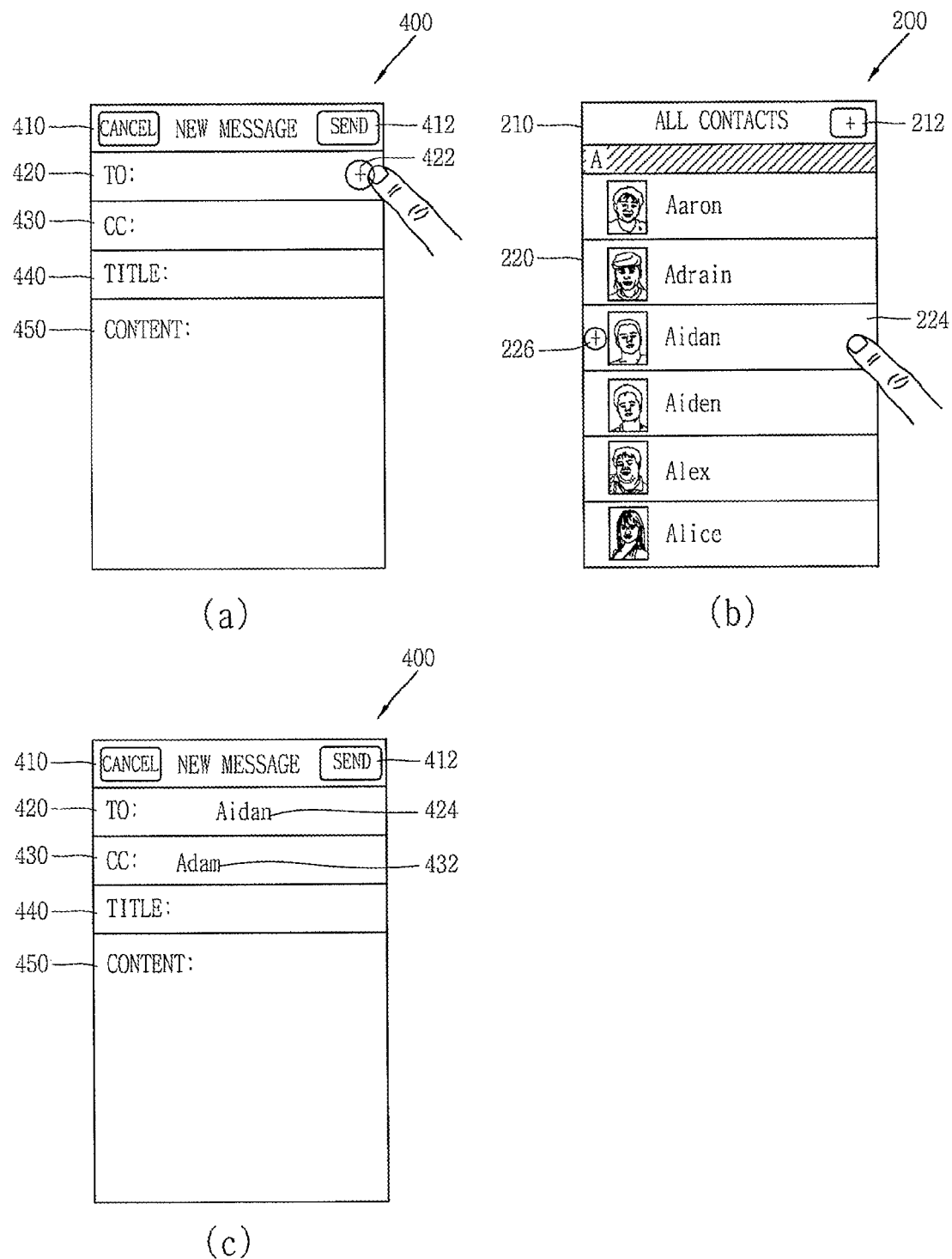
FIG. 13 is a view illustrating the operation example of a mobile terminal 100 according to a third embodiment disclosed herein.

FIG. 13 is a view illustrating the operation example of a mobile terminal 100 according to a third embodiment disclosed herein. Referring to FIG. 13(a), the mobile terminal 100 provides an interface for allowing the user to prepare a new mail. A mail preparation screen 400 may include a title area 410 for indicating information displayed on the display unit, a recipient designation area 420 for designating a person who receives the mail, a reference area 430 for designating a person who refers to the mail, a title preparation area 440 for preparing a title of the mail, and a content preparation area 450 for preparing a content of the mail.

On the recipient designation area 420, the user may directly input the contact of the recipient using a text input scheme, or select an import menu or icon 422 to select a contact that has been stored in advance in a phonebook of the mobile terminal 100.

If the import menu 422 is selected, then the contact list display screen 200 will be displayed as illustrated in FIG. 13(b). As described above, the contact list display screen 200 may include the title area 210 and list area 220, and an image and a name indicating a person corresponding to each contact may be displayed on the list area 220. Furthermore, an indicator 226 may be further displayed on the contact 224 subordinately connected to another contact to distinguish it from the another contact.

If a contact 222 which is not subordinately connected to another contact is selected, then the selected contact 222 may be designated and displayed on the recipient designation area 420 as illustrated in FIG. 13(a). However, if a contact 222 subordinately connected to another contact is selected or the email address is manually typed in for a contact associated with another contact, then the selected contact 222 may be designated and displayed on the recipient designation area 420 as illustrated in FIG. 13(c), and a contact 432 subordinately linked to the selected contact 424 may be designated and displayed on the reference area 430. Furthermore, if a send menu 412 is selected, then the mobile terminal 100 transmits a mail using the contact 424 as a recipient, and transmits the same mail using the contact 432 as a reference.

Accordingly, the user can perform multiple operations based on a contact selected by the mobile terminal 100 and a contact linked to the selected contact, respectively. Accordingly, there is an advantage that the user can transmit a mail at the same time to various contacts with a simple manipulation using a suitable scheme.

Figure 14:
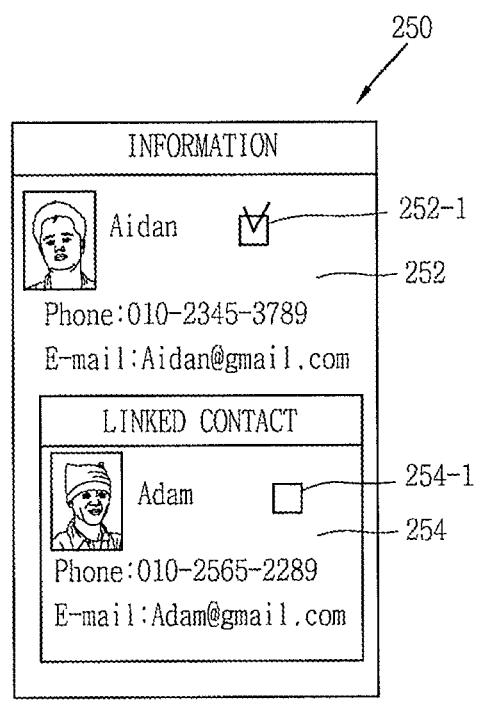
FIG. 14 is a view illustrating the process of selecting a main contact and an auxiliary contact according to a third embodiment disclosed herein.

FIG. 14 is a view illustrating the process of selecting a main contact and an auxiliary contact according to a third embodiment disclosed herein.

In order to prevent the user from unintentionally performing an operation for a plurality of contacts, the mobile terminal 100 provides an interface capable of selecting only a contact desired to perform the operation among the linked contacts. As described above, the contact information display screen 250 for displaying the detailed information of the connected contact may display the contact information 252 of a selected item and another contact information 254 linked or associated to the contact information 252.

A menu or an icon 252-1, 254-1 for selecting whether the relevant contact is to be contained as a parameter of operation implementation will be further displayed. The relevant contact may be contained or not contained when the menu 252-1, 254-1 is toggled. Accordingly, the user can individually select a contact desired to perform the operation. Based on toggling the icon 252-1 and not toggling the icon 254-1, the mail in the above example will not be sent to Adam when the Aidan contact is selected.

Figure 15:
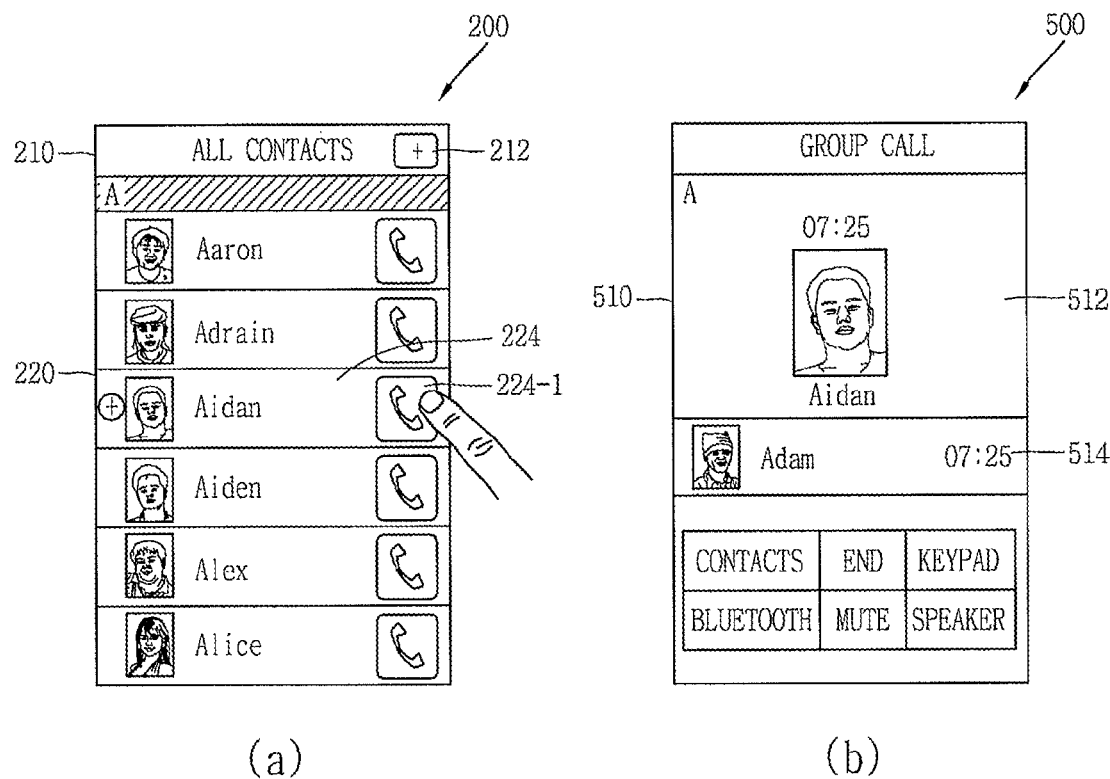
FIG. 15 is a view illustrating the operation example of a mobile terminal 100 according to a third embodiment disclosed herein.

FIG. 15 is a view illustrating the operation example of a mobile terminal 100 according to a third embodiment disclosed herein.

Referring to FIG. 15(*a*), the foregoing contact list display screen 200 may further display a call menu 224-1 for originating a call to each contact. When there does not exist another item associated or linked to the contact, the call menu may be merely an individual call menu requesting an individual call for the relevant item. However, when there exists another item connected to the contact, the call menu may be an individual call menu requesting a group call for the relevant contact and another contact linked to the relevant contact.

Moreover, if the call menu 224-1 is selected, then the mobile terminal 100 can request video communication for the relevant contact 224 while at the same time requesting voice communication for another contact linked to the relevant contact 224 as illustrated in FIG. 15(*b*). Accordingly, the mobile terminal 100 may display a group call screen 500 containing a video communication area 512 for the contact 224, and a voice communication area 514 for the another contact connected to the contact 224.

Accordingly, the mobile terminal 100 may provide an interface for performing video communication with a main contact, and performing voice communication with an auxiliary contact. There exists an advantage of solving the problem of a limited display space and network resource distribution, and providing convenience to the user when a main participant and auxiliary participants are divided in a conference.

Figure 16:
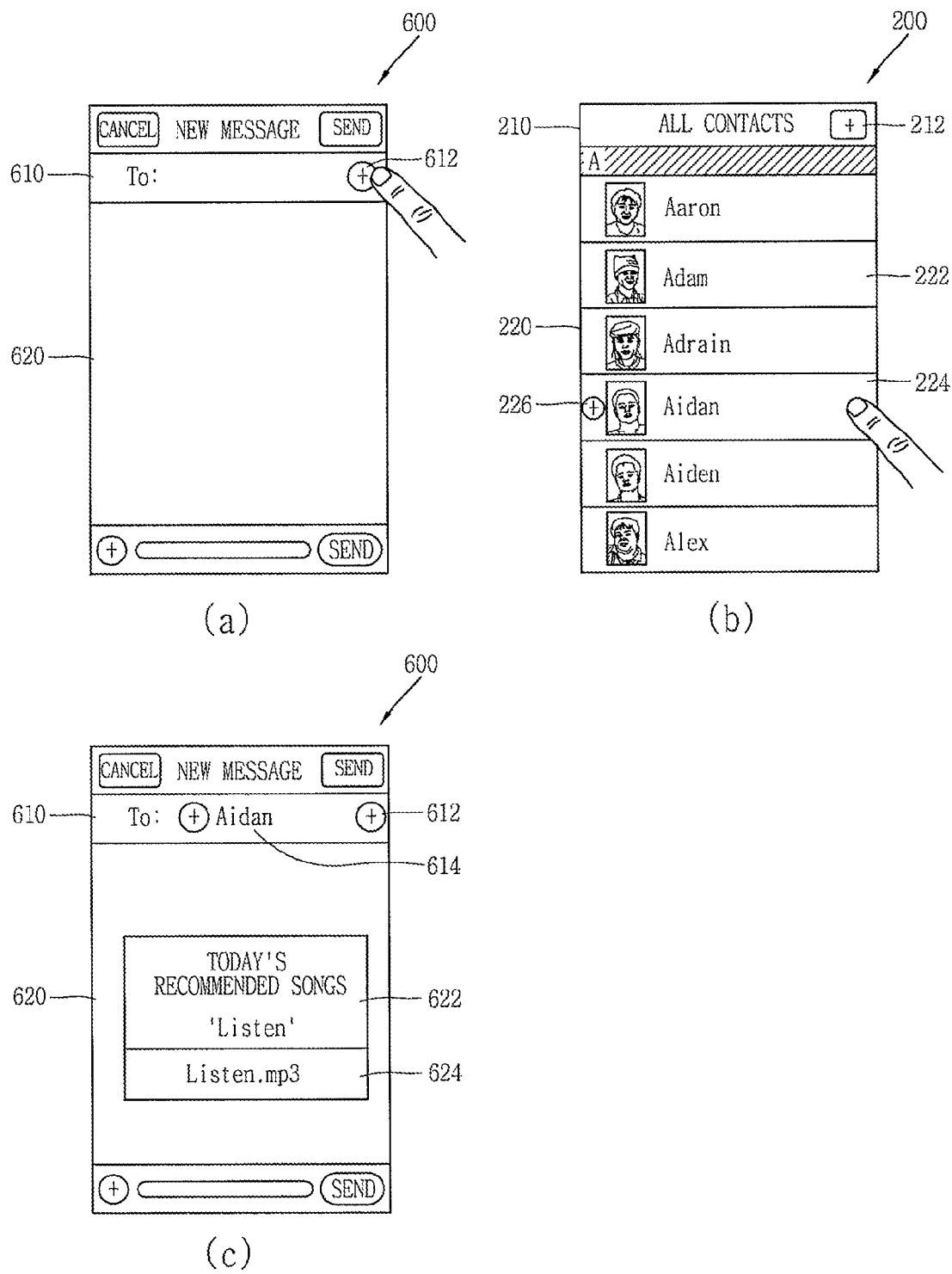
FIG. 16 is a view illustrating the operation example of a mobile terminal 100 according to a third embodiment disclosed herein.

FIG. 16 is a view illustrating the operation example of a mobile terminal 100 according to a third embodiment disclosed herein. Referring to FIG. 16(*a*), the mobile terminal 100 may provide an interface for preparing a new message (short message, multimedia message, etc.). A message preparation screen 600 may include a recipient designation area 610 for designating a person who receives the message, and a content preparation area 620 for preparing a content of the message.

On the recipient designation area 610, the user may directly input the contact of the recipient using a text input scheme, or select an import menu 612 to select a contact that has been stored in advance in a phonebook of the mobile terminal 100.

If the import menu 612 is selected, then the contact list display screen 200 will be displayed as illustrated in FIG. 16(*b*). As described above, the contact list display screen 200 may include the title area 210 and list area 220, and an image and a name indicating the person of each contact may be displayed on the list area 220. Furthermore, an indicator 226 may be further displayed on the contact 224 subordinately linked to another contact to distinguish it from the another contact.

If a contact 224 subordinately linked to another contact is selected or manually typed into the area 610, then the selected contact 614 may be designated and displayed on the recipient designation area 610 as illustrated in FIG. 16(*c*). Furthermore, multimedia data 624 such as a picture, video, and the like in addition to text 622 may be added to the message on the content preparation area 620.

The mobile terminal 100 transmits multimedia data 624 along with text 622 to the selected contact 614. Furthermore, the mobile terminal 100 transmits only text 622 excluding multimedia data 624 to a contact associated to the selected contact 614. For instance, the mobile terminal 100 transmits a message to the selected contact 614 using a Multimedia Messaging System (MMS), and transmits the same message to a contact associated to the selected contact 614 using a Short Message Service (SMS).

Accordingly, different operations may be performed for a contact selected by the mobile terminal 100 and a contact associated to the selected contact, respectively, though one contact has been selected only. Accordingly, there is an advantage that the user can transmit a mail at the same time to various contacts with a simple manipulation using a suitable scheme.

Figure 17:
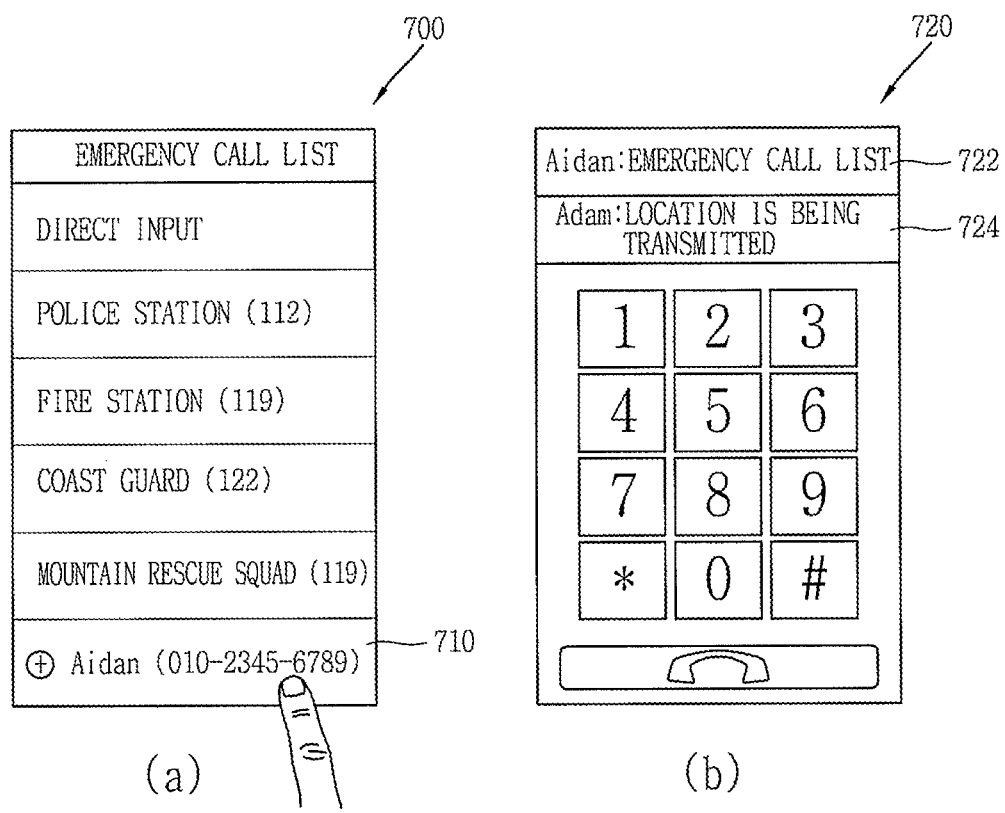
FIG. 17 is a view illustrating the operation example of a mobile terminal 100 according to a third embodiment disclosed herein.

FIG. 17 is a view illustrating the operation example of a mobile terminal 100 according to a third embodiment disclosed herein. Referring to FIG. 17(*a*), the mobile terminal 100 may provide an emergency call list display screen 700. The emergency call list display screen 700 is provided for the user to directly originate a call to a predetermined contact with a simple manipulation in an emergency state, and the emergency call list display screen 700 may be displayed even though the lock is not released in a locked state. The emergency call list display screen 700 may display several contacts predetermined by the mobile terminal 100 or a contact 710 predetermined by the user.

In particular, the user may associate or link one or more auxiliary contacts to one main contact or allow the one main contact to be contained in an emergency call list through the foregoing user interface. In this manner, if the contact 710 predetermined by the user is selected, then an emergency call request to the corresponding main contact 722 will be carried out as illustrated in FIG. 17(*b*). At the same time, location information to which the mobile terminal 100 has requested an emergency call will be transmitted to one or more auxiliary contacts 724 connected to the main contact 722.

Accordingly, the user can use an emergency call service in a safer manner, and particularly, the emergency call service may exhibit a synergy effect with the location information service, and a burden of the user's selection required for this may be mostly resolved by using the foregoing user interface.

On the other hand, in addition to the foregoing embodiments, an embodiment may be also taken into consideration that if a message is received from an external device when the mobile terminal 100 is designated as a main contact by the external device, then the mobile terminal 100 transfers the message to another external device designated as an auxiliary contact. For instance, information on the main contact and auxiliary contact may be received through a message from the external device, or may be stored in advance in the mobile terminal 100. In case where a grade such as a manager, a general member, or the like is provided in the Internet community, such an embodiment may be useful when a manager is designated as a main contact and general members are designated as auxiliary contacts.

The present disclosure discloses a mobile terminal for maximizing the use of a contact connecting function by providing a highly expandable interface capable of connecting two or more contacts.

A method may include displaying a contact list containing a plurality of contacts; designating a first contact in the contact list as a first recipient according to a user's input; designating at least one second contact as a second recipient when there exists the at least one second contact connected to the first contact; and performing a first operation for the first recipient, and performing a second operation subordinate to the first operation for the second recipient.

The method may be characterized in that the first operation is an operation for designating the first recipient as a receiver to transmit a mail, and the second operation is an operation for designating the second recipient as a reference to transmit the mail.

The method may be characterized in that the first operation is an operation for transmitting a message to the first recipient using a Multimedia Messaging System (MMS), and the second operation is an operation for transmitting a message to the second recipient using a Short Message Service (SMS).

The method may be characterized in that the first operation is an operation for performing a call with the first recipient using a video communication scheme, and the second operation is an operation for performing a call with the second recipient using a voice communication scheme.

The method may be characterized in that the first operation is an operation for placing an emergency call to the first recipient, and the second operation is an operation for sending location information of the mobile terminal when making the emergency call to the second recipient.

The method may further include storing the second contact by associating it to the first contact.

A mobile terminal may include a display unit configured to display a contact list containing a plurality of contacts; and a controller configured to designate a first contact in the contact list as a first recipient according to a user's input, and designate at least one second contact as a second recipient when there exists the at least one second contact connected to the first contact, and perform a first operation for the first recipient and perform a second operation subordinate to the first operation for the second recipient.

A method may include displaying a list containing a plurality of items on a display unit; configuring a storage area on the display unit; storing a first item selected from the list in the storage area; and connecting a first contact associated with the first item to a second contact associated with a second item selected from the list.

The method may further include performing a first operation for the first contact, and performing a second operation subordinate to the first operation for the second contact when the first contact is designated as a recipient.

The method may be characterized in that the storing step includes selecting an item dragged and dropped from the list to the work area as the first item, and said connecting step includes selecting an item corresponding to the position at which the first item has been dropped as the second item when the first item has been dragged and dropped from the work area to the list.

The method may be characterized in that said configuring the work area includes displaying the work area on the display unit.

The method may be characterized in that the work area is displayed on the display unit until the association or linking step is carried out or an input for releasing the work area is received.

The method may be characterized in that the work area is displayed on the display unit to overlap with part of a region where the list is displayed.

A method may include displaying a list containing a plurality of items on a display unit; configuring a storage area on the display unit; storing at least one item selected from the list in the storage area; and connecting a plurality of contacts associated with the at least one item.

The method may be characterized in that said storing step includes selecting at least one item dragged and dropped from the list to the storage area.

The method may be characterized in that the at least one item is a Social Network Service (SNS) bulletin.

The method may be characterized in that said connecting step includes receiving an input for selecting any one of the at least one items; and connecting a contact associated with the selected any one item to a contact associated with the other remaining item.

The method may be characterized in that the storage area is displayed on the display unit until the connecting step is carried out or an input for releasing the storage area is received.

The method may be characterized in that said connecting step is performed to link a plurality of contacts stored in a phone book when the plurality of contacts are stored in the phone book.

The method may further include performing a first operation for a specific contact when the specific contact is designated as a recipient among the plurality of contacts, and performing a second operation subordinate to the first operation for the remaining contact among the plurality of contacts.

According to the present disclosure, different functions may be carried out for a contact designated by the mobile terminal and a contact associated to the contact by allowing one contact to be designated by the user, thereby having an effect of enhancing the convenience of a contact management function. Furthermore, an intuitive user interface for associating two or more different contacts may be provided in the mobile terminal, thereby allowing whoever to use the relevant function in an easy and convenient manner.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mobile terminal, comprising:
 a touch screen configured to display a first contact list having a plurality of contacts including a first contact and a second contact; and
 a controller coupled to the touch screen, wherein detailed information of a first contact is displayed on the touch screen based on a touch input to the first contact, wherein the detailed information includes an icon for linking at least one contact, a second contact list having the plurality of contacts is displayed on the touch screen based on a touch input to the icon, the second contact list excluding the first contact, and the detailed information of the first contact with information of the second contact is displayed on the touch screen based on a touch input on the second contact in the second contact list, and a third contact list having the plurality of contacts is displayed on the touch screen, the third contact list excluding the second contact.

2. The mobile terminal of claim 1, wherein the second contact is linked to the first contact in the third contact list.

3. The mobile terminal of claim 1, wherein linked contacts are displayed in a prescribed area of the touch screen.

4. The mobile terminal of claim 3, wherein at least one of the linked contacts displayed in the prescribed area includes a delete icon to delete the corresponding contact from the prescribed area.

5. The mobile terminal of claim 3, wherein the linked contacts displayed in the prescribed area are designated as a main contact or an auxiliary contact.

6. The mobile terminal of claim 1, wherein the first and second contacts are configured such that prescribed functions performed with respect to the first contact are selectively performed on the second contact.

7. The mobile terminal of claim 1, wherein a third contact among the plurality of contacts is a contact associated with a social network service (SNS).

8. The mobile terminal of claim 7, wherein at least one contact having a social network service (SNS) relationship with the third contact is generated based on the third contact.

9. The mobile terminal of claim 8, wherein the generated contact related to the third contact is linked to the third contact.

10. The mobile terminal of claim 8, wherein the generated contact having the SNS relationship with the third contact is added to the third contact list.

11. A method of controlling a mobile terminal, comprising:
displaying on a touch screen a first contact list having a plurality of contacts including a first contact and a second contact; and displaying detailed information of a first contact on the touch screen based on a touch input to the first contact, wherein the detailed information includes an icon for linking at least one contact, displaying a second contact list having the plurality of contacts on the touch screen based on a touch input to the icon, the second contact list excluding the first contact, and displaying the detailed information of the first contact with information of the second contact on the touch screen based on a touch input on the second contact in the second contact list, and generating a third contact list having the plurality of contacts for display on the touch screen, the third contact list excluding the second contact.

12. The method of claim 11, wherein the second contact is linked to the first contact in the third contact list.

13. The method of claim 11, further including displaying linked contacts in a prescribed area of the touch screen.

14. The method of claim 13, wherein at least one of the linked contacts displayed in the prescribed area includes a delete icon to delete the corresponding contact from the prescribed area.

15. The method of claim 13, wherein the linked contacts displayed in the prescribed area are designated as a main contact or an auxiliary contact.

16. The method of claim 11, further including selectively performing a prescribed function performed with respect to the first contact on the second contact linked to the first contact.

17. The method of claim 11, wherein a third contact among the plurality of contacts is a contact associated with a social network service (SNS).

18. The method of claim 17, further including generating at least one contact having a social network service (SNS) relationship with the third contact generated based on the third contact.

19. The method of claim 18, further including linking the generated contact related to the third contact to the third contact.

20. The method of claim 18, further including adding the generated contact having the SNS relationship with the third contact to the third contact list.

* * * * *